P. H. SCHWARTZ.
EXTENSION STANDARD FOR SPRING SUPPORTS FOR VEHICLE SEATS.
APPLICATION FILED NOV. 1, 1910.
1,005,893.
Patented Oct. 17, 1911.
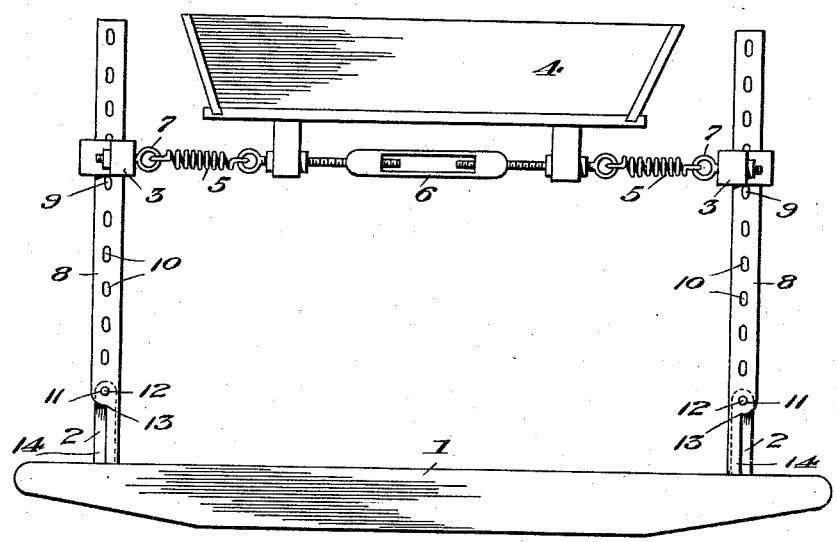
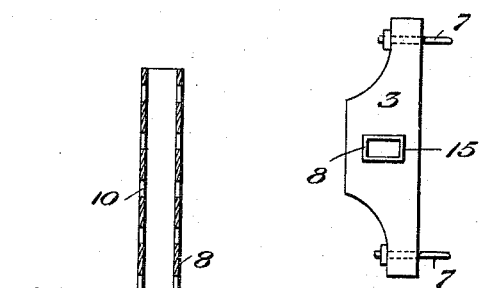
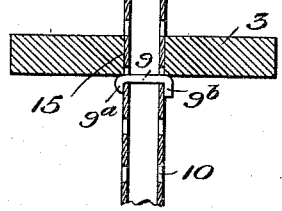
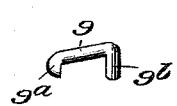
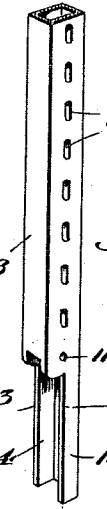
Witnesses
Inventor
Paul H. Schwartz
By Henry N. Copp
his attorney

UNITED STATES PATENT OFFICE.

PAUL H. SCHWARTZ, OF BIG SANDY, MONTANA.

EXTENSION-STANDARD FOR SPRING-SUPPORTS FOR VEHICLE-SEATS.

1,005,893. Specification of Letters Patent. Patented Oct. 17, 1911.

Application filed November 1, 1910. Serial No. 590,232.

*To all whom it may concern:*

Be it known that I, PAUL H. SCHWARTZ, a citizen of the United States, residing at Big Sandy, county of Chouteau, and State of Montana, have invented certain new and useful Improvements in Extension-Standards for Spring-Supports for Vehicle-Seats, of which the following is a specification.

This invention relates to extension standards for spring supports for vehicle seats.

The present invention, which is adapted for use in connection with the spring support for vehicle seats set forth in my Patent No. 946,881, dated Jan. 18, 1910, has for its object the provision of novel extension standards for attachment to the ordinary standards on a vehicle body in such manner that the spring floated seat may be positioned at any desired height according to the weight of the load carried between the standards and which will also serve to keep poles, boards, or other contents of the vehicle from falling off if the vehicle is loaded above the ordinary bolster standards now commonly used, the invention being designed to enable the spring supported seat of my aforesaid patent to be used either on ordinary standards or on the present improved standards at any desired height according to the circumstances and requirements.

The invention is set forth fully hereinafter and the novel features are recited in the appended claim.

In the accompanying drawings: Figure 1 is a front elevation of the invention applied to the ordinary bolster standards; Fig. 2, a section through one of the extension standards, showing how the cross tree is supported; Fig. 3, a plan view thereof; Fig. 4, a perspective of one of the extension standards; and Fig. 5, a detail of one of the locking devices.

The bolster 1 and the relatively short standards 2 are such as are used on any wagon or vehicle. The cross trees 3 are designed to fit over the standards 2 as disclosed in my Patent No. 946,881, for the purpose of supporting the seat 4 which is provided with the springs 5, turn-buckles 6 (only one set being shown), the springs being connected to the eyes or rings 7 on the cross trees 3.

The present invention consists of the extension standards 8 and locking members or pins 9. The standards 8 are of metal, hollow, and of preferably square or rectangular form in cross section, provided with series of elongated slots 10 and with bolt holes 11 at their lower parts to receive the bolts 12 which pass through corresponding holes in the upper ends of the usual standards 2 to secure the said extension standards to them, the lower ends of the extension standards being cut away at 13, leaving sufficient of the walls 14 thereof to embrace the standards 2 at the inner parts thereof. Consequently the extension standards can be readily and easily applied by the mere insertion of the bolts 12, the strain due to the weight on the seat 4 forcing the lower ends of the extension standards outwardly against the standards 2, insuring a firm joint.

The cross trees 3 have apertures 15 of a size adapted to snugly yet easily fit the extension standards as well as the ordinary standards 2 and the cross trees can be slid up or down to any desired height and supported by the locking devices or pins 9 which have the heads or lugs $9^a$ and $9^b$, one shorter than the other and of such size that the said lug or head $9^a$ may be drawn through the elongated slots 10 when suitably manipulated. The weight of the cross trees 3, however, on these locking devices 9 guides them in the bottoms of the slots and hence they cannot become loose, but upon raising the cross trees slightly, the locking devices may be raised and pulled out through the slots 10.

The present extension standards may or may not be used according to requirements. When used, the seat may be disposed at any height according to the weight of the load and the seat is thus freely floated so as to make riding comfortable while, at the same time, the extension standards retain the articles such as boards, poles, etc., which may be piled on the vehicle above the ordinary standards.

Having thus described my invention what I claim as new and desire to secure by Letters Patent, is:—

The combination with wagon standards, of hollow extension standards provided with transverse slots arranged lengthwise thereof, said standards being cut away at their lower parts to receive the inner sides of said wagon standards and provided with bolts for their connection thereto, removable locking devices adapted to be positioned in any of the openings, cross trees slidable on said extension standards and adapted for support by said removable devices, and a seat connected to the cross trees, whereby the extension standards are held against the inner sides of the wagon standards.

In testimony whereof, I hereunto affix my signature in presence of two witnesses.

PAUL H. SCHWARTZ.

Witnesses:
RUDOLPH MOLT,
H. F. SCHWARTZ, Sr.

Copies of this patent may be obtained for five cents each, by addressing the "Commissioner of Patents, Washington, D. C."